(12) United States Patent
Williams, II

(10) Patent No.: US 7,140,148 B1
(45) Date of Patent: Nov. 28, 2006

(54) FISHING LINE RETAINING DEVICE

(76) Inventor: Wallace W. Williams, II, 12600 CR 270, Nathrop, CO (US) 81236

( * ) Notice: Subject to any disclaimer, the term of this patent is extended or adjusted under 35 U.S.C. 154(b) by 146 days.

(21) Appl. No.: 10/903,593

(22) Filed: Jul. 29, 2004

Related U.S. Application Data

(60) Provisional application No. 60/497,876, filed on Aug. 25, 2003.

(51) Int. Cl.
*B42F 1/02* (2006.01)
(52) U.S. Cl. ..................... 43/54.1; 24/129 C; 224/269; 224/270; 224/248; 248/302; 248/303
(58) Field of Classification Search ................ 43/54.1; 24/129 C, 555, 67.9; 224/103, 182, 185, 224/666, 678, 270; 248/689, 592, 249, 302, 248/303
See application file for complete search history.

(56) References Cited

U.S. PATENT DOCUMENTS

| 227,115 A | | 5/1880 | Lawrence | |
|---|---|---|---|---|
| 378,369 A | | 2/1888 | Hyer | |
| 468,227 A | | 2/1892 | Pflueger | |
| 653,051 A | | 9/1900 | Woods | |
| 681,934 A | | 9/1901 | Smith | |
| 802,027 A | | 10/1905 | Bishop | |
| 1,004,392 A | | 9/1911 | Ehrlich et al. | |
| 1,198,202 A | | 9/1916 | Drinkard | |
| 1,326,887 A | * | 12/1919 | Wood ........................... | 24/3.1 |
| 1,487,083 A | | 3/1924 | Zimmermann | |
| 1,516,024 A | * | 11/1924 | Meyer ......................... | 211/30 |
| 1,536,267 A | | 5/1925 | Putnam | |
| 1,554,740 A | * | 9/1925 | Licht ........................... | 248/303 |
| 1,688,506 A | | 10/1928 | Rivers | |
| 1,970,970 A | * | 8/1934 | Nolan .......................... | 220/557 |
| 2,490,279 A | | 12/1949 | Nunamaker | |
| 2,546,222 A | | 3/1951 | Funk | |
| 2,564,260 A | * | 8/1951 | Houser ......................... | 24/533 |
| 2,576,624 A | | 11/1951 | Miller | |
| 2,615,649 A | | 10/1952 | Flewelling | |
| 2,643,803 A | | 6/1953 | Bates | |
| 2,692,599 A | | 10/1954 | Creelman | |
| 2,910,749 A | | 11/1959 | Parker | |
| 3,328,986 A | | 7/1967 | Ralton | |
| 3,345,713 A | | 10/1967 | Gaupp | |
| 3,358,399 A | | 12/1967 | Waldmann | |
| 3,363,255 A | | 1/1968 | Nienaber | |
| 3,524,336 A | | 8/1970 | Crosby et al. | |
| 3,783,471 A | | 1/1974 | McGeary et al. | |
| 3,795,072 A | | 3/1974 | Sherman | |
| 4,214,686 A | * | 7/1980 | Dostourian .................. | 224/667 |
| 4,237,587 A | * | 12/1980 | Hsiao et al. .................. | 24/555 |
| 4,297,802 A | | 11/1981 | Normann | |
| 4,402,471 A | | 9/1983 | Normann | |
| 4,821,543 A | | 4/1989 | Scungio | |

(Continued)

*Primary Examiner*—Peter M. Poon
*Assistant Examiner*—John D. Holman
(74) *Attorney, Agent, or Firm*—Townsend and Townsend and Crew LLP

(57) ABSTRACT

A one piece device for temporarily holding fly fishing line stripped from a reel and prior to being cast. The device is made from a single piece of continuous metal rod, bent at various locations along the rod to form a holding arm and a base clip. The fishing line is hung in coils from the holding arm. The clip may be attached to clothing, thereby securing the device on or about an angler, so that when a cast is made, the line uncoils from the arm.

17 Claims, 2 Drawing Sheets

U.S. PATENT DOCUMENTS

| | | |
|---|---|---|
| 4,919,317 A | 4/1990 | Luedtke |
| 4,974,764 A | 12/1990 | Cantwell |
| 5,022,124 A * | 6/1991 | Yiin .................... 24/67.9 |
| 5,182,877 A | 2/1993 | Burchill et al. |
| D339,909 S | 10/1993 | Burton |
| 5,331,721 A | 7/1994 | Raum, Sr. |
| 5,402,555 A * | 4/1995 | Boland .................... 24/129 C |
| 5,542,204 A | 8/1996 | Heaney |
| 5,628,141 A | 5/1997 | Crawford |
| 5,657,514 A | 8/1997 | Fabrizio |
| 5,687,892 A | 11/1997 | Johns |
| 5,709,012 A | 1/1998 | Ebashi |
| 5,778,495 A | 7/1998 | Paugh |
| 5,816,458 A | 10/1998 | Yonenoi |
| 5,819,379 A | 10/1998 | Van Hout et al. |
| 5,855,086 A | 1/1999 | Pandeles |
| 5,890,638 A | 4/1999 | Woloshen |
| D409,464 S | 5/1999 | Garza |
| 6,052,936 A | 4/2000 | Garcia |
| 6,119,390 A | 9/2000 | Dickie |
| 6,135,381 A | 10/2000 | Teson |
| D433,563 S | 11/2000 | Capanna et al. |
| 6,188,881 B1 | 2/2001 | Braxton |
| 6,189,258 B1 | 2/2001 | Anderson |
| 6,226,843 B1 * | 5/2001 | Crainich .................... 24/545 |
| 6,279,362 B1 | 8/2001 | Lee |
| D461,746 S | 8/2002 | Olson et al. |
| 6,578,745 B1 | 6/2003 | Taylor et al. |
| 6,612,714 B1 | 9/2003 | Morre et al. |
| D480,555 S | 10/2003 | Bledsoe |
| 6,702,506 B1 | 3/2004 | Iitsuka |

\* cited by examiner

FISHING LINE RETAINING DEVICE

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates generally to fly fishing and, more particularly, to a device used for holding an article, such as a fly fishing line after stripped from a fly fishing reel.

The practice, art, sport, or hobby of fly fishing generally refers to using a long, light-weight rod. The fly rod typically has several guides or eyelets aligned along the rod. The line passes through these guides, and is fed from a fly reel attached to the butt end of the fly rod. For casting, typically there is a required amount of line with a lure or artificial fly tied to the tip end of the line pulled from the reel. Casting uses the momentum of the line created by the forward and reverse movement of the fly rod to place the lure or fly on the water.

Both before and after a cast is made, the line is usually "stripped." For example, before casting, the line is pulled out from the reel in a sufficient amount to make the initial cast. After a cast is made, the line is also stripped in order to retrieve it in preparation for the next cast. The line can be stripped by pulling it by hand toward the butt end of the rod. Between casts, the stripped line generally ends up on the ground, on the water, on the floor of a boat, or floating downstream. The loose line may get in the way of the next cast, or tangle at the angler's feet or in nearby rocks, stumps, branches or weeds. Further, the loose line can pick up dirt or other matter, which may cause abrasive wear or damage to the line, and also impact the distance or accuracy of the next cast because of drag on the line.

Many attempts have been made to temporarily store stripped fishing line, but all have drawbacks in their use or cost of manufacture. For example, line stripping baskets have been tried in many sizes and shapes. They are expensive and cumbersome to operate and carry around. They also limit the view and range of work area immediately in front of the angler.

A line storage device which sits on the ground may work in some circumstances but, even in those circumstances, it is not very mobile and is susceptible to being stepped on and interfering with the cast.

Another known line storage device includes a spring held on the angler's clothing. The spring pinches the line to hold it in place. However, this type of device may not hold very much line and, while trying to attach the line to the spring on the storage device, the angler is often distracted from watching the line on the water.

SUMMARY OF INVENTION

There is provided in accordance with the present invention a device for holding an article such as a fly fishing line, wherein the device may be secured to clothing or the like. In one embodiment, there is provided a retaining device for holding off-reel fishing line, comprising a base member or clip for securing the retaining device to a person casting the line, and an elongated arm extending from the clip and away from the body of the person. The arm receives the line as (or after) it is stripped so that it may be hung from the arm prior to casting. In some embodiments, the retaining device is produced from a single piece or length of steel rod, bent at several points along the rod to form the clip and the elongated arm.

In another embodiment, there is provided a method for producing a device for holding an article (such as fishing line), the method including the steps of providing a single length of a bendable rod, bending the rod at a first point along its length to form an elongated arm, with the elongated arm having two generally parallel arm members joined at the first point to form the end of the arm, and bending the rod at one or more second points away from the first point to form a clip for attachment to an article of clothing or the like. The clip has first (front) and second (back) clip members that are joined at a bend in the rod to form a first, closed end of the clip and that are spaced apart away from the first end to form a second, open end of the clip, so that the article of clothing may be placed between the first and second clip members through the open end of the clip to thereby secure the device to the clothing.

A device in accordance with the present invention does not distract from fishing. It is inexpensive. It does not hinder any front work area. It is completely portable and can be used anywhere. It protects the fly line and prolongs its useful life by keeping the line away from abrasive weeds, rocks and sand. In one embodiment, the device is made of rust resistant stainless steel for salt water use as well as fresh water. It is lightweight and can be adjusted for varying or various thickness of clothing. There are no components to wear out on it or to replace. Casting efficiency is increased by use of the device.

DETAILED DESCRIPTION OF THE INVENTION

Figure 1:
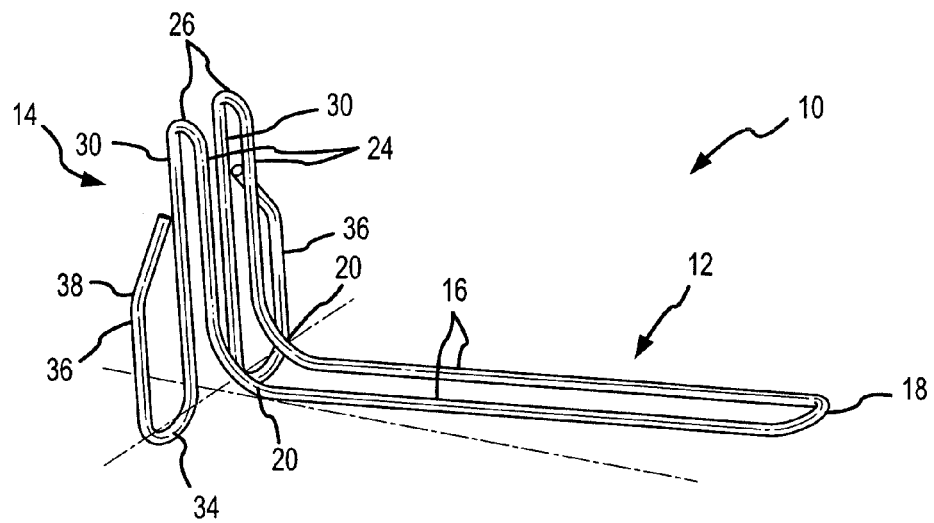
FIG. 1 is a perspective view of a fishing line holder or retaining device in accordance with one embodiment of the present invention.
Figure 2:
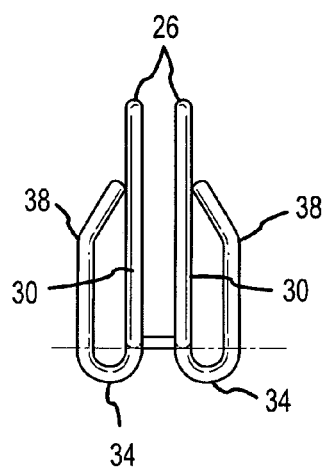
FIG. 2 is a rear view of the fishing line retaining device.
Figure 3:
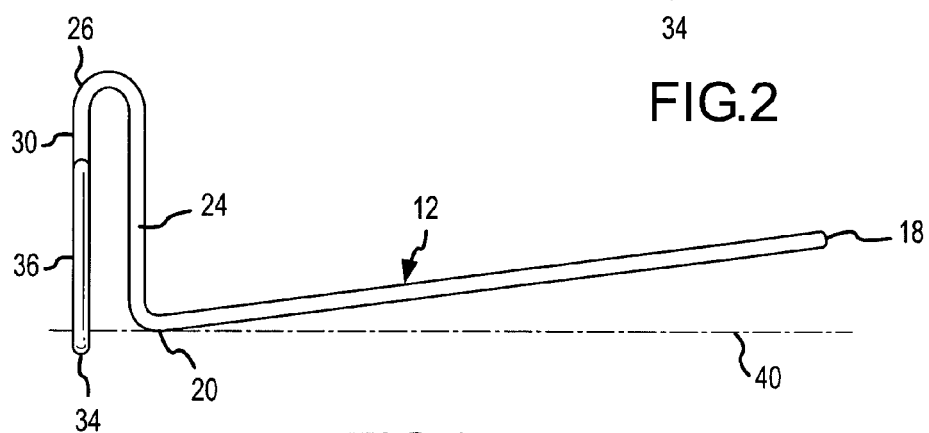
FIG. 3 is side view of the fishing line retaining device.

Referring now to FIGS. 1, 2 and 3, a fishing line retaining device 10 in accordance with one embodiment of the invention is illustrated. The device 10 has an elongated holder or arm 12 for holding stripped fishing line and a clip 14 to be attached, for example, to an angler's belt, clothing or waders.

In one embodiment, the device 10 is formed from a single piece of stainless steel rod, approximately 17 inches (43.18 centimeters) in length, and having a diameter of 3/32 inches (0.2381 centimeters), bent at various locations or points along the rod to form both the arm 12 and the clip 14. As seen best in FIG. 1, the arm 12 has two parallel arm members 16, each of the same or approximately the same length. The arm members 16 are joined at one end by a bend 18, and are each joined at the other end to the clip 14 by upright bends 20. The clip 14 has a pair of upright front members 24 joined at an upper bend 26 to a pair of back members 30. The back members 30 each include a lower bend 34 forming extended arms 36 (extending in a direction generally perpendicular to bends 26 and clip members 24 and 30) that each have a slight bend 38 in order to terminate near the bend 26. The back members 30 of the clip are thus shaped by the bends 34 and 38 in order to provide a sufficient profile to cooperate with front members 24 to securely grasp an article of clothing (such as a belt, pocket, or waistband) when the device 10 is in use.

In the embodiment shown in FIGS. 1, 2 and 3, the device 10 is formed in a symmetrical fashion, with the bend 18 formed at the midpoint of the rod from which the device 10 is made. If a 3/32 inch diameter rod is used, each of the bends 18, 20, 26 and 34 may have an inside radius of approximately 3/32 inches (0.2381 centimeters). As seen best in FIG. 3, the bend 20 may be less than 90 degrees, so that the arm 12 is above the horizontal line 40 (as viewed in FIG. 3), but still generally perpendicular to clip 14. However, the arm 12 can be further bent in either direction by the user (at bend 20) in order to best suit the user in providing a proper angle for holding the fishing line (so that it does not slip off the end of the arm at bend 18) and in facilitating a proper cast (so that the line readily uncoils from the arm 12 as it pays out through the rod guides).

Figure 4:
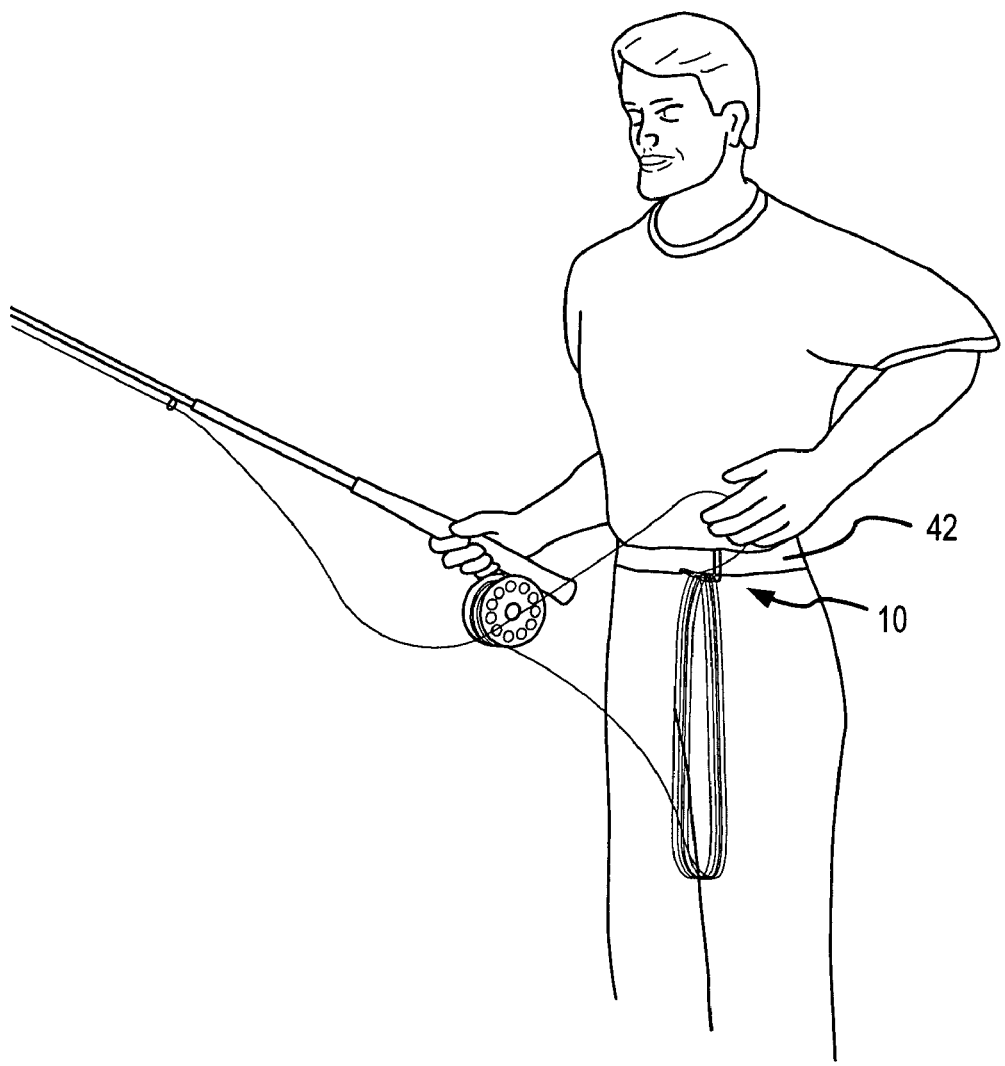
FIG. 4 is a perspective view illustrating the fishing line retaining device clipped to the belt of an angler.

FIG. 4 shows the device 10 secured to a user. As illustrated, the device 10 is clipped to an angler's belt 42. However, in actual use, the device may be clipped to any part of clothing (or other articles worn by the user) to suit the convenience and comfort of the user. Thus, it may be clipped to the waistband of pants or shorts, a front pocket, or a safety belt on chest waders, among other things. The device is secured to the clothing by passing the edge of the clothing through the open end of the clip (between front clip members 24 and back clip members 30, seen best in FIG. 3), until the clothing contacts the closed end of the clip at bends 26. The space between members 24 and 30 can be made to suit the common thickness of belts or other articles, but the user may also adjust the space to accommodate any thicknesses by bending the clip (in either direction) at the bends 26, as long as the fit is snug and secures the device to the clothing. As seen best in FIG. 3, the bend 34 may extend slightly below bend 20 so that the device can be easily attached to clothing using one hand. As illustrated in FIG. 4, when secured, the arm 12 of device 10 extends in a general direction in front or forward of the user (i.e., the direction of the cast).

It should be appreciated that in some circumstances it may be desired to secure the device 10 to something other than clothing, i.e., any item at or about the user (e.g., a wall, the side of a boat, or any other relatively flat, upright object or article).

Still referring to FIG. 4, when the device 10 is put to use, fly line is stripped from the reel and coiled in the stripping hand. After a sufficient amount of line has been removed, the coil is placed over the holder with the palm facing in toward the user's body. This makes it more likely that the line coming from the fly rod (as opposed to the line from the reel) is closest to the end of the arm 12, to provide a better cast. A cast is then made. The fly line will uncoil from arm 12 and pay out through the rod guides. It should be appreciated that the shape of the arm (two arm members 16 with an endpoint at the curved bend 18) facilitates the uncoiling and payout.

Retrieval of the line (after the cast) is made in one of two ways or a combination of both. The line can be coiled in the stripping hand and then placed on the holder with the palm facing out as opposed to facing in (this also makes it more likely that the line coming from the rod is closest to the end of arm 12). Alternatively, the line can be stripped in and placed over the arm 12 one coil at a time as it is stripped in. With this method, the action of the stripping hand is "over and drop, over and drop." The arm 12 is long enough (in one embodiment, approximately 4 inches—10.16 cm) so that placement of the line does not have to be observed each time this move is executed, so that the user can keep eyes on the line and fly still on the water. A combination of these methods may also be used.

When a desired amount of fly line has been placed on the holder, it can be cast in a normal manner. Conditions and experience will dictate the size of the coils placed on arm 12. For example, the coils will often be large (many users will probably prefer loops hanging at least 12–18 inches from the arm 12) and should be fairly consistent in size.

While the device 10 is described in one embodiment as formed from a rod having a length of 17 inches and having a diameter of 3/32 inches, rods of various lengths and diameters may be used, and the radiuses for the bends 18, 20, 25, 34 and 38 may vary, depending on the desired shape and size of the device. Thus, all the various dimensions stated herein are merely exemplary. Further, while the illustrated device 10 is described as made from stainless steel, other material may be used (e.g., plastic, copper rod, aluminum rod, non-stainless steel rod, and so forth). If plastic is used, it would be preferable that the resin be flexible in the finished state to allow attachment of the device to articles of different thickness. Also, while the device 10 is described as useful for holding fishing line, it may have other uses due to its unique and advantageous construction. As an example only, tools (i.e., screw driver, putty knife, scissors, etc.) and other items (e.g., trigger-type squirt bottle towel, clipboard, hat, roll of tape, hand bag, plastic grocery sack, etc.) could be hung from arm 12 while the device is attached to a user. Many other uses (not described) are of course possible. The arm 12 may be easily modified during fabrication (e.g., the bend 18 and the spacing between arm members 16 may be widened) to accommodate various items (e.g., the blade of a screw driver).

While a detailed description of presently preferred embodiments of the invention have been given above, various alternatives, modifications, and equivalents will be apparent to those skilled in the art without varying from the spirit of the invention. Therefore, the above description should not be taken as limiting the scope of the invention.

What is claimed is:

1. A one piece fishing line retaining device for holding stripped fishing line when a person is fly-casting, comprising:

a clip for being secured to clothing of the person; and an elongated arm for holding the fishing line and extending away from the clip;

wherein the clip and arm are formed from a single piece of continuous rod having bends at locations along the rod, the rod being bent at a first location midway between its ends to form the arm with two arm members, with the arm members joined by the bend at the first location to provide an endpoint of the arm;

wherein the rod is bent at locations away from the first location to form the clip, including a bend at a second location joining the arm to the clip and forming a first clip member that is generally perpendicular to the arm, and a bend at a third location away from the second location joining the first clip member to a second clip member;

wherein the arm is substantially straight along the length of the arm between the first location and the second location, so that the arm, the first location, and the second location lie in the same plane; and wherein the first and second clip members are generally parallel to each other and are joined at the bend at the third location in order to define a dosed end of the dip and are spaced apart away from the bend at the third location in order to define an open end of the clip, so that the clothing may be passed between the clip members at the open end of the clip to thereby secure the clip to the clothing.

2. The device of claim 1, wherein the device is symmetrical, having a pair of bends at second locations, each joining one arm member to a corresponding one of a pair of first clip members, and a pair of bends at third locations, each away from a corresponding one of the bends at second locations, in order to form a pair of first clip members and a pair of second clip members.

3. The device of claim 1, wherein the first clip member is generally perpendicular to the arm.

4. The device of claim 1, wherein the bend at the third location at which the first and second clip members are joined in order to form the closed end of the clip is a 180 degree bend.

5. The device of claim 1, wherein the bend at the first location is a 180 degree bend.

6. The device of claim 1, wherein the bend at the second location is generally perpendicular.

7. The device of claim 3, wherein the first and second clip members are generally parallel to each other.

8. The device of claim 2, wherein all of first clip members and second clip members are generally parallel to each other.

9. The device of claim 2, wherein the rod is a stainless steel rod having a diameter of approximately $3/32$ inches (approximately 2.4 millimeters).

10. The device of claim 9, wherein the arm members of the elongated arm are of approximately the same length.

11. A method for producing a device for holding an article, wherein the device may be secured to an article of clothing or the like, the method comprising:

providing a single length of a bendable rod;

bending the rod at a first point along its length to form an elongated arm for use in holding the article, the elongated arm having two generally parallel arm members that are joined at the first point to form the end of the arm; and bending the rod at one or more second points away from the first point to form a clip for attachment to the article of clothing, the clip having first and second parallel clip members that are joined at a bend at a third point to form a first, closed end of the clip and that are spaced apart away from the closed end to form a second, open end of the clip, so that the article of clothing may be placed between the first and second clip members through the open end of the clip to thereby secure the device to the article of clothing;

wherein the arm is substantially straight along the length of the arm between the first point and the second point, so that the arm, the first point, and the second point lie in the same plane.

12. The method of claim 11, wherein the rod is a stainless steel rod having a diameter of approximately $3/32$ inches (approximately 2.4 millimeters).

13. The method of claim 11, wherein the arm members of the elongated arm are of approximately the same length.

14. The method of claim 11, wherein the first and second clip members are aligned in a direction generally perpendicular to the direction of the elongated arm.

15. The method of claim 14, wherein the rod is bent at two second points, each second point being at the end of one of the arm members opposite the first point and each being the same distance from the first point, so that the clip comprises two sets of first and second clip members, with the article of clothing placed between both sets of first and second clip members.

16. The method of claim 15, wherein the arm and clip are formed so that when the device is secured, line from a fly fishing rod and reel may be hung in coils from the arm and thereby be positioned to uncoil when the line is cast.

17. The method of claim 15, wherein each second clip member is bent at a fourth point away from the third point, to form a clip member arm extending in a direction perpendicular to the direction of the elongated arm and perpendicular to the direction of the first and second clip members.

* * * * *